United States Patent [19]

Hönel et al.

[11] Patent Number: 5,132,458
[45] Date of Patent: * Jul. 21, 1992

[54] CURABLE COMPOUNDS

[75] Inventors: Michael Hönel; Peter Ziegler, both of Mainz; Hartmut Foedde, Taunusstein, all of Fed. Rep. of Germany

[73] Assignee: Hoechst AG, Fed. Rep. of Germany

[*] Notice: The portion of the term of this patent subsequent to Feb. 21, 2006 has been disclaimed.

[21] Appl. No.: 560,433

[22] Filed: Jul. 31, 1990

Related U.S. Application Data

[63] Continuation of Ser. No. 229,146, Aug. 5, 1988, abandoned.

[30] Foreign Application Priority Data

Aug. 8, 1987 [DE] Fed. Rep. of Germany ....... 3726497

[51] Int. Cl.$^5$ .................. C07C 215/00; C07D 317/34
[52] U.S. Cl. ..................... 564/367; 524/591; 524/874; 528/45; 528/49; 528/73; 528/370; 549/229

[58] Field of Search ............... 524/591, 874; 528/45, 528/49, 73, 370; 564/367

[56] References Cited

U.S. PATENT DOCUMENTS 4,806,611  2/1989  Honel et al. .......................... 528/45
4,808,658  2/1989  Walz et al. .......................... 524/591

Primary Examiner—Richard L. Raymond
Attorney, Agent, or Firm—Bierman and Muserlian

[57] ABSTRACT

A curable compound carrying groups containing basic nitrogen, essentially comprising structural units derived from A) a compound which contains, on average, at least one preferably terminal 2-oxo-1,3-diololane group per molecule, with B) a secondary diamine containing hydroxyl groups in the $\beta$-positions to the secondary amino groups, it also being possible for this amine to contain blocked primary amino groups, and, if appropriate, C) a difunctional amine containing at least one free primary amino group and, if appropriate, at least one secondary amino group.

17 Claims, No Drawings

CURABLE COMPOUNDS

PRIOR APPLICATION

This application is a continuation of U.S. patent application Ser. No. 229,146 filed Aug. 5, 1988, now abandoned.

DESCRIPTION

German Auslegeschrift 2,265,195 describes an electrodepositable synthetic resin prepared from an epoxy resin, a polyamine derivative containing latent primary amino groups which are blocked by ketimine groups and containing at least one secondary amino group, and also, if appropriate, another primary or secondary amine. However, the process is not very suitable for incorporating polyamines into the resin as flexibilizing chain extenders. Accordingly, the properties of these resins are frequently unsatisfactory under mechanical load (impact cupping, Erichsen cupping), in particular in the case of electrodeposited coatings on electroconducting substrates.

In addition, German Offenlegungsschrift 3,644,370 proposes binders, in particular for water-dilutable, cathodically depositable surface coatings, which are products of the reaction of compounds containing 2-oxo-1,3-dioxolane groups and certain polyamines. Coatings obtained therefrom are satisfactory with respect to adhesion to the so-called filler, but not in all cases.

Surprisingly, it has now been found that binders obtainable by reacting compounds containing 2-oxo-1,3-dioxolane groups with certain secondary diamines and, if appropriate, further difunctional amines containing free primary amino groups, and, if appropriate, chain terminators produce, in curable mixtures, surface-coating films which are distinguished by particularly good properties on mechanical load and optimized inter-layer adhesion, in particular to PVC or filler coatings.

The invention therefore relates to curable compounds carrying groups containing basic nitrogen, essentially comprising structural units derived from A) a compound which contains, on average, at least one, preferably terminal 2-oxo-1,3-dioxolane group per molecule, with
B) a secondary diamine containing hydroxyl groups in the β-positions to the secondary amino groups, it also being possible for this amine to contain blocked primary amino groups, and, if appropriate,
C) a difunctional amine containing at least one free primary amino group and, if appropriate, at least one secondary amino group.

The invention furthermore relates to a process for the preparation of these curable compounds, and to curable mixtures containing these curable compounds, and to the use thereof, in particular in surface-coating preparations.

Compound (A) can be any materials so long as they contain on average at least one, preferably two or three, 2-oxo-1,3-dioxolane groups per molecule and do not contain any other functional groups which could interfere with the reaction with components (B) and, if appropriate, (C). The molecular weight $\overline{M}_n$ (number average, determined by gel chromatography, PS standard) should generally be between 100 and 10,000, preferably between 150 and 3500, and the 2-oxo-1,3-dioxolane equivalent weight should be between 100 and 1250. The 2-oxo-1,3-dioxolane groups are preferably terminal, but, in some cases, compounds which contain these groups randomly distributed over the molecule chain and can be prepared by copolymerization using olefinically unsaturated compounds containing this 2-oxo-1,3-dioxolane group can also be employed as component (A). A preparation process of this type is described, for example, in German Offenlegungsschrift 3,644,373.

Component (A) preferably has the general formula (I)

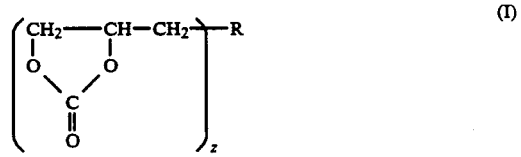

in which
R denotes
  a z-valent radical or a polyether, polyether polyol, polyester or polyester polyol, which radical may, if appropriate, also contain ($NR^2$) groups where $R^2$ represents hydrogen, alkyl having 1 to 8 carbon atoms or hydroxyalkyl having 1 to 8 carbon atoms, or
  a z-valent hydrocarbon radical, preferably an alkylene radical having 2 to 18 carbon atoms which may optionally carry inert or non-interfering groups, or
  a z-valent poly(sec.)amine radical or
  the z-valent radical of a product of the reaction of an epoxy-carbonate compound with polyamines, polyols, polycaprolactone polyols, OH group-containing polyesters, polyethers, polyglycols, hydroxyl-, carboxyl- and amino-functional polymer oils having mean molecular weights from 800 to 10,000, polycarboxylic acids, hydroxyl- or amino-functional polytetrahydrofurans and products of the reaction of polyamines with glycidyl esters of α,α-dialkylalkanemonocarboxylic acids of the empirical formula $C_{12-14}H_{22-26}O_3$ or with the glycidyl ester of versatic acid, and
z denotes 1 to 5.

The index z in this formula (I) preferably represents 2 or 3, in particular 2.

Components (A) of this type are described, for example in German Offenlegungsschriften 3,624,454 and 3,644,370. to which reference is made here.

The radical R in the above formula (I) may specifically have the meanings (Ia) to (Id) below:

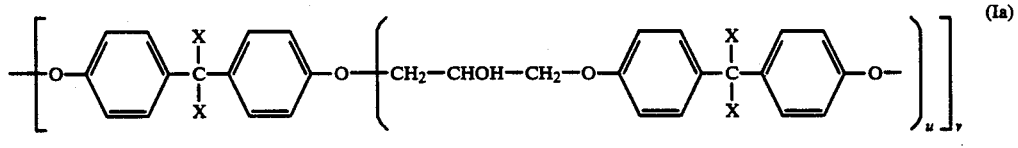

tions.

in which X is hydrogen or methyl, u is 0 to 5 and v is 1 to 20, preferably 1 to 6. The values of u and v should be regarded as a statistical mean since the molecular weight distribution of the glycidyl ethers can cover a wide range;

mer oils, and PI represents the radical of a polyisocyanate.

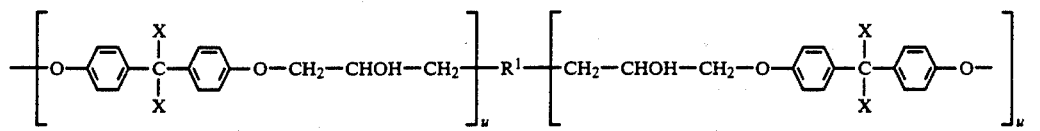
(Ib)

in which X and u have the meaning mentioned and $R^1$ represents O-alkyl-O or N-alkyl-N, each having 2 to 18 carbon atoms in the alkyl radical, or represents the radical of polyamines, polyols, polycarprolactone polyols, OH group-containing polyesters, polyethers, hydroxyl-, carboxyl- and amino-functional polymer oils, polycarboxylic acids, hydroxyl- or amino-functional polytetrahydrofurans and products of the reaction of polyamines with glycidyl ethers or glycidyl esters of carboxylic acids which are branched in the α-position and have 8 to 14 carbon atoms (so-called ®Versatic acids), The compounds of the formula (I), like the compounds (II) and (VII) described below, can be prepared by adduction of $CO_2$ to the corresponding epoxide group-containing compounds. Processes of this type are described, for example, in PCT(WO) Patent Application 84/03 701 and in German Offenlegungsschriften 3,529,263 and 3,600,602. Reference is made here to their disclosure, including the preferred embodiments. Suitable initial polyepoxides are listed, for example, in Wagner/Sarx, "Lackkunstharze 121 [Synthetic surface-coating resins]", Carl Hansa Verlag (1971), pp. 174 ff, and in European Offenlegungsschrift 60,506, to which refer-

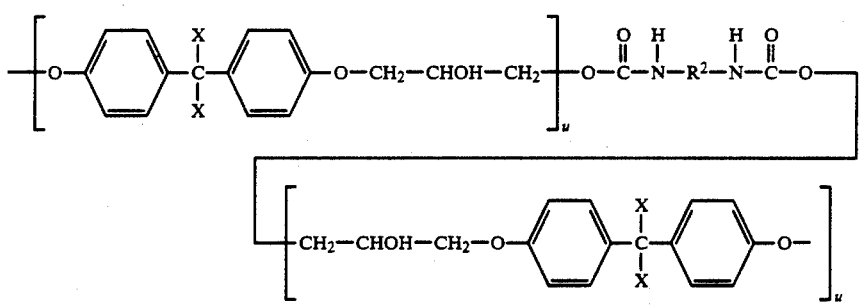
(Ic)

in which X and u have the meaning mentioned and $R^2$ represents alkylene having 2 to 18 carbon atoms or the radical of a poly(sec.)amine or an amino-functional polytetrahydrofuran;

ence is likewise made here.

Preferred starting materials for the preparation of the cyclic carbonates (I) and the mixed epoxide/carbonate compounds (II) are the polyglycidyl ethers of polyphe-

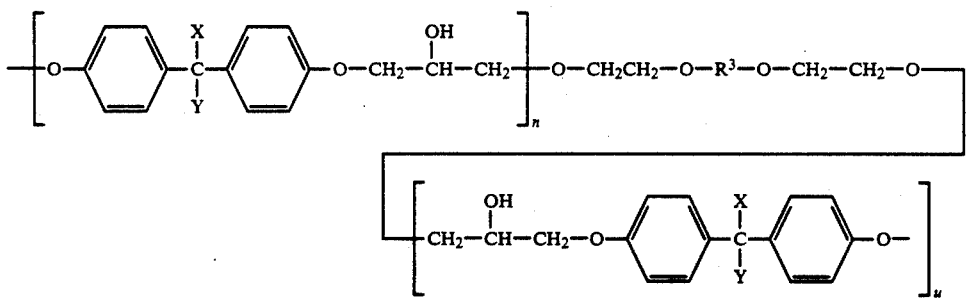
(Id)

in which X and u again have the meaning mentioned, but u is preferably 1, and $R^3$ represents the

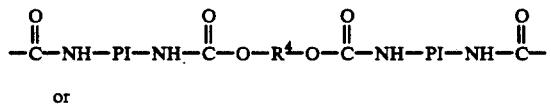

or

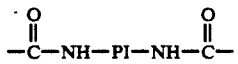

in which $R^4$ is identical to $R^1$, with the exception of the polycarboxylic acids and the carboxyl-functional polynols, for example bisphenol A. The glycidyl ethers are obtained for example, by reacting a polyphenol with epichlorohydrin. Polyphenols are, for example, bis(4-hydroxyphenyl)-2,2-propane, bis(4-hydroxyphenyl)methane, 4,4'-dihydroxybenzophenone, bis(4-hydroxyphenyl) 1,1'-ether, bis(4-hydroxyphenyl)-1,1'-isobutane, bis(2-hydroxynaphthyl)methane and 1,5-dihydroxynaphthalene. They preferably contain free hydroxyl groups in addition to the epoxide groups in the polyglycidyl ether of the polyphenol.

In some cases, it may be expedient to employ flexibilized compounds as component (A). In this case, the starting point for the preparation of component (A) is, for example, mixed epoxide/carbonates, such as those of the general formula (II)

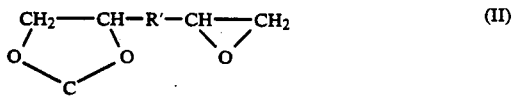

in which R' corresponds to the meaning of R in the formula (I). These mixed epoxide/carbonates are reacted with compounds which exert a flexibilizing action on the molecule, for example the polyamines mentioned as component (C), aliphatic or aromatic polyols, such as diols, triols or tetraols, for example ethylene glycol, propylene glycol, polyalkylene glycols, neopentyl glycol, glycerol, trimethylolpropane, pentaerythritol and polycaprolactone polyols, furthermore OH group-containing polyesters, polyethers, polyglycols, hydroxyl-, carboxyl- and amino-functional polymer oils, polycarboxylic acids, hydroxyl- and amino-functional polytetrahydrofurans, products of the reaction of polyamines with glycidyl ethers or glycidyl esters of versatic acid, or polyether polyesters which contain terminal carboxyl groups. The reactions with these flexibilizing compounds are carried out under conditions under which the epoxide groups react very preferentially. In this way, compounds of the formula (I) which carry terminal cyclic carbonate groups which can be reacted with the amino compounds are again obtained.

The amines employed according to the invention as component (B) for constructing the curable compounds contain two secondary amino groups, for which at least one hydroxyl group is present in each case in the β-position. These amines preferably also contain at least one primary amino group, preferably one to three primary amino groups, which are all preferably blocked by ketones as ketimine groups. These primary amino groups may alternatively be reacted with monocarbonates. These amines may, if desired, also contain further groups so long as these do not react with the 2-oxo-1,3-dioxolane groups under the conditions present and do not interfere with construction of the resin, such as, for example, tertiary amino groups.

The carbon number of these amines (B) is generally 4 to 40, preferably 10 to 20. Amines which are suitable as component (B) are described, for example, in German Offenlegungsschrift 3,644,371, to which reference is made here. They can be prepared, for example, by reacting 1,2,3-trisubstituted propane compounds, such as epichlorohydrin, with primary diamines or with monoamines and primary diamines. A further way of preparing secondary diamines according to (B) is to react primary monoamines with diepoxides, the primary monoamine being employed in excess, usually in the molar ratio 2:1. Examples of such amines are 1,3-bis(-methyl-5-aminopentylamino)-2-propanol, trimethylhexyl-1,3-bis(6-aminohexyl)amino-2-propanol, 1,3-bis(-methyl-6-aminohexyl)-amino-2-propanol, and furthermore corresponding products of the reaction of ethanolamine, butylamine, 2-ethylhexylamine or appropriate mixtures with ®Epikote 828 or ®Epikote 1001 (molar ratio 2:1).

If the amines employed as component (B) contain primary amino groups, it is necessary that these are blocked, which can be effected in the customary manner by reaction with suitable ketones with removal of the water formed (for example by azeotropic distillation) and of any excess ketone. Suitable ketones are primarily those which, apart from the keto group, contain no further groups which are reactive towards a primary amino group. Examples of these are methyl ethyl ketone, methyl propyl ketone, methyl isopropyl ketone, methyl isobutyl ketone, methyl isoamyl ketone, diethyl ketone, dipropyl ketone and cyclohexanone. Preferred ketones are methyl isobutyl ketone and diethyl ketone.

Preferred amines (B) for constructing the curable compounds according to the invention have, for example, the formulae (III) to (V) below

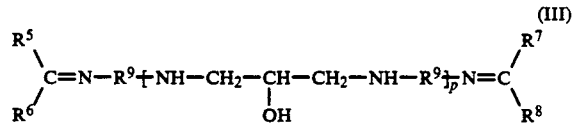

in which:

$R^5$, $R^6$, $R^7$ and $R^8$ denote identical or different ($C_1$-$C_6$)alkyl (branched or unbranched), or $R^5$ and $R^6$ or $R^7$ and $R^8$ denote part of a cycloaliphatic ring, or in each case one of the radicals $R^6$ and/or $R^8$ denotes aryl having 6 to 12 carbon atoms;

$R^9$ denotes

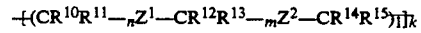

where $Z^1$ and $Z^2$ denote O, S, N-alkyl having up to 8 carbon atoms, N-phenyl, N-mono-, -di- or -trialkylphenyl having 1 to 4 carbon atoms per alkyl group, a divalent phenylene radical which is optionally substituted by inert or non-interfering groups, and/or a chemical bond, $R^{10}$ to $R^{15}$ denote H, $CH_3$, $C_2H_5$, phenyl or mono-, di- or trialkylphenyl having 1 to 4 carbon atoms per alkyl group, n, m and l denote 0 to 12, preferably 0 to 6, where the sum of $n+m+l \geq 2$, preferably $\geq 4$ and k denotes 1 to 6, preferably 1 to 3, and n denotes 1;

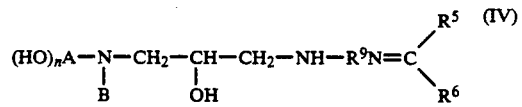

in which $R^5$, $R^6$ and $R^9$ have the same meaning as in the formula (III),

A denotes a branched or unbranched ($C_1$-$C_6$)alkyl

B denotes hydrogen, and n denotes 1 to 5;

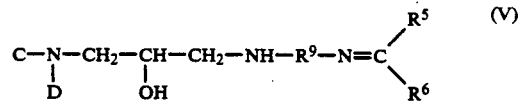

in which $R^5$, $R^6$ and $R^9$ have the same meaning as in the formula (III),

C denotes branched or unbranched ($C_1$-$C_8$)alkyl or ($C_5$-$C_9$)cycloalkyl, optionally substituted by ($C_1$-$C_3$)alkyl groups, and D denotes hydrogen.

It is also possible to employ mixtures of various amines as component (B).

As component (C) which can optionally also be employed, it is possible to use bifunctional amines containing at least one free primary amino group and optionally containing at least one secondary amino group.

For example, such polyamines may be diprimary and contain no further basic groups. Alternatively, they may additionally contain tertiary amino groups or secondary amino groups; however, the reaction conditions here must be chosen so that the latter do not react with the 2-oxo-1,3-dioxolane groups, since otherwise gelling occurs. Suitable polyamines are described, for example, in German Offenlegungsschrift 3,624,454, to which reference is made here.

Further suitable amines here are those which contain a primary amino group and a secondary amino group activated by a β-hydroxyl group.

Examples of amines appropriate for (C) are those of the formula (VI) below

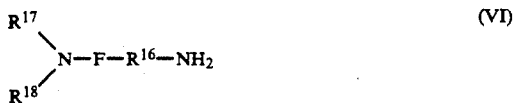

in which
R$^{16}$ denotes a divalent hydrocarbon radical, preferably a straight-chain or branched alkylene radical having 2 to 18 carbon atoms which may optionally carry inert or non-interfering groups,
R$^{17}$ and R$^{18}$ are identical or different and denote hydrogen, alkyl having 1 to 8 carbon atoms or hydroxyalkyl having 1 to 8 carbon atoms in the alkyl radical, it also being possible for R$^{17}$ and R$^{18}$ to produce a cyclic ring compound, and
F denotes a chemical bond or —(R$^{16}$—NH)$_r$—R$^{16}$—NH— in which r denotes zero or an integer from 1 to 6 and R$^{16}$ has the above meaning.

Specific representatives of these amines which may be mentioned are the following: ethylenediamine, propylenediamine, 2-methylpentamethylenediamine, hexamethylenediamine, octamethylenediamine, triacetonediamine, dioxadecanediamine, dioxadodecanediamine and higher homologs, cycloaliphatic diamines, such as 1,4-cyclohexanediamine; 4,4'-methylene-bis-cyclohexylamine, 4,4'-isopropylene-biscyclohexylamine, isophoronediamine, m-xylylenediamine, N-methylethylenediamine, hydroxyethylaminoethylamine, hydroxyethylaminopropylamine, N-aminoethylpiperazine, N,N-diethylethylenediamine, N,N-diethylpropylenediamine, N,N-dihydroxyethylethylenediamine, diethylenetriamine, dipropylenetriamine, bishexamethylenetriamine, triethylenetetramine, tetraethylenepentamine, pentaethylenehexamine, heptaethyleneoctamine and the like; furthermore products of the reaction of diamines, such as, for example, ethylenediamine, propylenediamine, hexamethylenediamine, trimethylhexamethylenediamine and m-xylylenediamine, with terminal epoxides, such as, for example, propylene oxide or hexene oxide, or with glycidyl ethers, such as phenyl glycidyl ether, ethylhexyl glycidyl ether or butyl glycidyl ether, or with glycidyl esters, such as "Cardura E10", or with unsaturated compounds, such as acrylonitrile or methacrylonitrile. In this case, the reaction must take place in a manner such that only one of the two primary amino groups present is alkylated, i.e. reacted with the epoxides or unsaturated compounds mentioned. To this end, the appropriate polyamino compound is employed in excess. Of course, it is also possible to use mixtures of the amines.

As component (C), it is also possible to use amines containing additional amide groups, as are obtained, for example, by condensation of primary diamines with dicarboxylic acids, such as adipic acid, sebacic acid, or dimeric fatty acid. It is also possible to use other amine adducts for this purpose, for example imides.

Other polyamines which can be employed as component (C) are, for example, also those corresponding to the above formula (III), but where the two terminal primary amino groups are not blocked. In this case, these polyamines are not used until the second step of the resin construction (first step: reaction of (A) and (B); in this respect, see below), where, through choice of suitable reaction conditions, only the primary amino groups, which are more reactive towards the 2-oxo-1,3-dioxolane groups, are reacted with the latter.

The mixing ratios of components (A), (B) and, where appropriate, (C) can vary within broad limits. In general, the amount of component (A) is 25 to 70 mol-%, preferably 30 to 60 mol-%, that of component (B) is 8 to 60 mol-%, preferably 10 to 15 mol-%, and that of component (C) is 0 to 60 mol-%, preferably 20 to 50. These components are preferably employed in amounts such that the ratio between the 2-oxo-1,3-dioxolane equivalents and the reactive amine equivalents of components (B)/(C) is between 0.8 and 1.2 mol-%, preferably 1.0 and 1.1 mol-%.

In order to limit the molecular weight of the curable compounds according to the invention, so-called chain terminators (D) are used in a preferred embodiment of the invention. In the case of terminal amino groups, i.e. when an excess of amine equivalents from (B)/(C) compared with the 2-oxo-1,3-dioxolane equivalents is present, these are, for example, monocarbonates, monoepoxide compounds and partly blocked polyisocyanates, it being possible to carry out the reactions simultaneously or in several separate steps.

Suitable monocarbonate compounds for this purpose are those of the formula (VII)

in which R$^{19}$ denotes hydrogen, alkyl having 1 to 18, preferably 1 to 10, carbon atoms, or radicals of the glycidyl ester of versatic acid, glycidyl esters or glycidyl ethers in which the epoxide group has been converted in the abovementioned fashion into cyclic carbonates.

Besides the monocarbonates and monoepoxides, it is also possible to employ partially blocked polyisocyanates since these compounds react first with a free NH$_2$ group. In principle, any amine reaction can be employed which preferentially commences at the primary amino group before the secondary amino groups present in the molecule react. The compounds employed for chain termination can additionally serve for flexibilization of the resultant surface coating material if appropriate long-chain compounds, which are known in practice, are incorporated.

In the case of terminal 2-oxo-1,3-dioxolane groups, amines which are monofunctional under the reaction conditions can be employed as chain terminators. Suitable as such are, for example, primary monoamines or secondary monoamines, such as methylamine, ethylamine, propylamine, butylamine, octylamine, laurylamine, stearylamine, ethanolamine, isononyloxypropylamine, N-methylaminopropylamine, diethyl(methyl)aminopropylamine, aminoethylethanolamine, neopentanolamine, dimethylaminopentanolamine, 3-aminopropanol, amidamines made from primary diamines and monocarboxylic acids, monoketimes of primary diamines and the like.

In addition, amines of the above formula (IV) (but in this case the radical B=alkyl or (HO)$_n$A) or of the formula (V) (but D is identical to C) are suitable for this purpose.

In addition, it is also possible to employ amines of the formula (VIII) below for this purpose

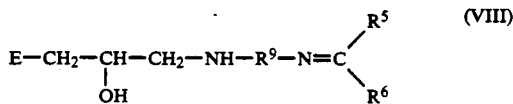

in which
R$^5$, R$^6$ and R$^9$ have the same meaning as in the formula (III), and
E denotes (C$_2$-C$_8$)alkoxy, linear or branched, or (C$_5$-C$_{15}$)acyloxy, preferably branched having C$_4$-C$_{15}$.

Finally, all amines according to (B) and (C) are, in principle, suitable as chain terminators, so long as they have been rendered monofunctional by means of blocking agents, such as monoepoxides and, in some cases, also monocarbonates, and partially blocked polyisocyanates, or by ketimine formation.

The amount of chain terminator (D) is generally 10 to 70 mol-%, preferably 20 to 40 mol-%, relative to the total molar mass of (A) to (D).

The molecular weight M$_n$ (number average; determined by means of gel chromatography, polystyrene standard) of the curable compounds according to the invention, is generally between 500 and 2000, preferably between 1000 and 10,000. The Staudinger index [$\eta$] usually has values from 0.5 to 2.0 [dl/g], determined in methoxypropanol. The amine numbers are usually between 10 and 300 mg of KOH/g, preferably between 20 and 100 mg of KOH/g. If the curable compounds are to have self-curing properties, some of the hydroxyl and/or primary or secondary amino groups present are reacted with a partially blocked polyisocyanate which still contains an average of about one free isocyanate group in the molecule. Another possibility is, for example, to introduce $\beta$-hydroxyalkylcarbamate groups by reacting some of the amino groups with a cyclic carbonate, such as ethylene carbonate. This method is described, for example, in German Offenlegungsschrift 3,246,812 and European Offenlegungsschrift 119,769.

In order to prepare the curable compounds according to the invention, components (A), (B) and preferably (D), and, if appropriate, additionally (C) are reacted in the stoichiometric ratios or amounts necessary at elevated temperatures and preferably in the presence of catalysts and inert solvents. The reaction is generally carried out until, for example, a constant amine number or the theoretical amine number is reached.

Elevated temperature here is taken to mean the range from about 50° to 140° C., preferably 70° to 120° C.

Whereas it is generally not necessary to use a catalyst for the reaction of the primary amino groups of component (C) with the 2-oxo-1,3-dioxolane groups of component (A), catalysis is expedient for the reaction of the less reactive secondary amino groups of component (B). Suitable catalysts for this purpose are strongly basic compounds, such as quaternary ammonium compounds, for example alkyl-, aryl- and/or benzylammonium hydroxides and carbonates. Specific representatives of quaternary ammonium compounds in this case are alkylbenzyldimethylammonium hydroxide (alkyl=C$_{16}$-C$_{22}$), benzyltrimethylammonium hydroxide and tetrabutylammonium hydroxide.

Preferred catalysts are strongly basic amines, for example diazabicyclooctane (DABCO), guanidine, etc.

So-called supranucleophilic catalysts, for example 4-pyrrolidinopyridine and poly-(N,N-dialkylaminopyridine), are also suitable here; in this respect, cf. the article by R. A. Vaidya et al. in Polymer Preprints, Vol. 2 (1986), pp. 101-102.

Inert solvents for the above reaction which may be mentioned here are, for example: halogenated hydrocarbons (less suitable when used as dip coatings), ethers, such as diethyl ether, 1,2-dimethoxyethane, tetrahydrofuran or dioxane; ketones (if a component (C) is used), such as, for example, acetone, methyl ethyl ketone, methyl isobutyl ketone, cyclohexanone and the like; alcohols, such as methanol, ethanol, 2-butoxyethanol, propanol, isopropanol, 2-methoxy-1-propanol, butanol and benzyl alcohol; esters (less suitable when used as dip coatings), such as butyl acetate, ethyl glycol acetate and methoxypropyl acetate; (cyclo)aliphatic and/or aromatic hydrocarbons, such as hexane, heptane, cyclohexane, benzene, toluene and the various xylenes, and aromatic solvents in the boiling range from 150° to 180° C. (higher-boiling mineral fractions such as $^{(R)}$Solvesso). The solvents can be employed here individually or as mixtures.

On stoichiometric assessment of the starting materials and also of the reaction products with respect to the progress of the reaction, the amine number, which can be determined in a customary manner by titration with perchloric acid, is taken as the basis for components (B)/(C), and the cyclocarbonate equivalent number, which can be determined in a customary manner by titrating with potassium hydroxide solution, is taken as the basis for components (A)/(D).

Various routes can be followed in the preparation of the curable compounds according to the invention. Thus, the polyamino compounds (B)/(C) according to the invention can be introduced into the reaction individually or as mixtures or at successive points in time, optionally dissolved in non-interfering, organic solvents. In an analogous manner, individual or different modified cyclic carbonates of component (A) can be introduced into the reaction individually or as mixtures or at successive points in time, preferably mixed with organic solvents which are inert to cyclocarbonate groups. Furthermore, it is possible, for example, to initially react component (A) with component (B) in the presence of suitable catalysts and then to further react, in a second step, the reaction product thus obtained with component (C)—if appropriate with addition of more of component (A), and if appropriate with addition of chain terminators (D)-without catalysis to form the final product. Alternatively, the reaction of components (A) to (D) can also be carried out in a one-step reaction, where it should be ensured, by choice of reaction components (B)/(C) and/or the reaction conditions, that components (B)/(C) are only able to react bifunctionally.

If it is desired to obtain a self-curing product, component (A) can, for example, initially be reacted with the partially blocked isocyanate and the resin construction can then take place by reaction with component (B) and, where appropriate (C) and (D). Component (A) can be employed for this purpose in unflexibilized or flexibilized form. The reaction of the hydroxyl and/or secondary amino groups present in component (A) with the partially blocked isocyanate is carried out here under conditions such that the cyclic carbonate groups are not attacked. On the other hand, it is also possible to initially construct the curable compound in its entirety and then to subsequently introduce the blocked isocyanate groups into the final product.

Polyisocyanates employed, after appropriate partial blocking, for the preparation of self-curing compounds may be any desired polyisocyanates known from the area of polyurethanes or surface coatings, for example aliphatic, cycloaliphatic or aromatic polyisocyanates. Some of the isocyanate groups may have been reacted in a known manner, with customary blocking agents. Typical examples of the polyisocyanates used are xylylene diisocyanates, diphenylmethane 4,4'-diisocyanates, triphenylmethyl 4,4'-triisocyanate, triphenylmethane triisocyanate, polyphenylpolymethyl isocyanate, 2,2,4(2,4,4)-methycyclohexyl diisocyanate, dicyclohexylmethyl diisocyanate, diethylfumarohexyl isocyanate, bis(3-methyl-4-isocyanatocyclohexyl)methane, 2,2-bis(4-isocyanatocyclohexyl)propane, the methyl ester of lysine diisocyanate, the biuret of hexamethylene diisocyanate, diisocyanates of dimeric acids, 1-methylbenzene 2,4,5-triisocyanate, biphenyl 2,4,4'-triisocyanate, the triisocyanate made from 3 moles of hexamethylene diisocyanate and 1 mole of water and having an NCO content of 16%, and further compounds containing at least two NCO groups per molecule, preferably isophorone diisocyanate, hexamethylene diisocyanate and tri- and tetramethylhexamethylene diisocyanate, but in particular 2,4- or 2,6-toluylene diisocyanate, or mixtures of these compounds. The polyisocyanates on which the PI radical is based in the compounds may be identical or different.

Besides these simple polyisocyanates, those are also suitable which contain heteroatoms in the radical linking the isocyanate groups. Examples of these are polyisocyanates containing carbodiimide groups, allophonate groups, isocyanurate groups, urethane groups, acylated urea groups or biuret groups.

Finally, suitable polyisocyanates are also the known prepolymers containing terminal isocyanate groups, as are accessible, in particular, by reacting the abovementioned simple polyisocyanates, above all diisocyantes, with excess amounts of organic compounds containing at least two groups which are reactive to isocyanate groups. However, these prepolymers are preferably employed as external curing components in co-reacting systems.

Suitable blocking agents are aliphatic, cycloaliphatic or alkylaromatic (monohydric) alcohols, for example lower aliphatic alcohols such as methyl alcohol, ethyl alcohol, various propyl, butyl and hexyl alcohols, heptyl alcohol, octyl alcohol, nonyl alcohol, propargyl alcohol, decyl alcohol and the like; furthermore unsaturated alcohols such as allyl alcohols, cycloaliphatic alcohols such as cyclopentanol and cyclohexanol, alkylaromatic alcohols such as benzyl alcohol, methylbenzyl alcohol and p-methoxy- and p-nitrobenzyl alcohol, and monoethers of glycols, such as ethylene glycol monoethyl ether, monobutyl ether and the like. Further blocking agents are ketoximes, expediently having 3 to 20 carbon atoms, preferably 3 to 10 carbon atoms, such as acetone oxime, methyl ethyl ketone oxime (=butanone oxime), hexanone oxime (such as methyl butyl ketone oxime), heptanone oxime (such as methyl-n-amyl ketone oxime), octanone oxime and cyclohexanone oxime, CH-acidic compounds such as alkyl malonates, esters of acetoacetic acid and esters of cyanoacetic acid, in each case having 1 to 4 carbon atoms in the ester group, NH-acidic compounds, such as caprolactam, and amino alcohols, such as diethylethanolamine. Phenol, which is known as a blocking agent, can be employed in cases where the reaction product is used for the production of solvent-containing surface coating materials.

On the other hand, it is also possible, for example, to add a customary curing agent, as used for co-reacting 2-component surface coating materials, to the aminourethanes according to the invention. The following, for example, are suitable for this purpose: blocked polyisocyanates, such as described above for the self-curing aminourethanes, furthermore $\beta$-hydroxy esters of at least bifunctional polycarboxylic acids, products of the reaction of dialkyl malonates with aldehydes and ketones which react, with elimination of water, to form unsaturated dicarboxylates (Knoevenagel synthesis), transesterification or transamidation curing agents, Michael addition products, for example as described in German Offenlegungsschriften 3,315,469, 3,417,441 and 3,602,981. Reference is hereby made to these literature references, including the preferred embodiments. In addition, amino resins (urea, melamine) and phenolic resins and $\beta$-hydroxyalkyl carbamate crosslinking agents should also be mentioned here.

Suitable curing components for the aminourethanes according to the invention, preferably in non-aqueous surface coating materials, are also epoxide group-containing compounds, such as, for example, low-molecular-weight polyepoxides, epoxide group-containing copolymers and di- or polyglycidyl ethers of aliphatic or aromatic alcohols. In addition, curing components which should be mentioned here are also oligomeric or polymeric compounds which contain at least two 1,3-dioxolan-2-one groups or at least one 1,3-dioxolan-2-one group and one epoxide group per molecule; these incude, for example, the compounds (I) and (II).

The amount of these crosslinking agents depends on the type and number of the mutually reactive groups in the binder and crosslinking agent and on the crosslinking density desired. The weight ratio between the binder and crosslinking agent is usually between 1:10 and 10:1, preferably between 1:5 to 5:1 and very preferably 1:1.

It is also possible to incorporate into the system the flexibilization which is necessary for some applications, if appropriate in addition to the flexibilization caused by components (A) and/or (B)/(C), via the admixed curing agent or via the incorporated curing agent (=self-crosslinking systems).

The curable compounds according to the invention are preferably employed as binders in solvent-based or, preferably, water-based surface-coating preparations which produce coatings having very good properties. Such coatings can be produced by customary methods, such as brushing, spraying, dipping, pouring, knife-coating or preferably by cathodic deposition on a very wide variety of substrates, such as wood, plastic or, preferably, metal.

In order to obtain aqueous systems, which are preferably used as electrocoating materials, it is advantageous to neutralize all or some of the basic amino groups in order to obtain coating compositions which can be electrodeposited from aqueous solution at a bath pH between about 3 and 9.

The basic groups are generally neutralized using water-soluble acids, for example formic acid, acetic acid, lactic acid or phosphoric acid, or appropriate mixtures. In the individual cases, the amount of acid depends on the properties of the resin used and is generally only carried out until the resin is solubilized or converted into a stable, aqueous emulsion (or dispersion). In general, degrees of neutralization (DN) from 20 to 70% are necessary for this. The meq values (mmol of acid/100 g of solid) given in the examples are related to the former by the following equation:

$$\text{meq} = \frac{DN \times AN}{5.61}$$

The solids contents of the electrocoating materials are generally 10 to 30% by weight.

Aqueous preparations which have a particularly low content of volatile organic solvents, for example 0.5 to 5% by weight, relative to the total solids content (determined at 125° C./60 min), are obtained—as described, for example, in German Offenlegungsschrift 3,602,980—by distilling off the solvents present in the binders due to the preparation or solution. This process step is preferably carried out on the partially neutralized resin under reduced pressure.

The ketimine structures obtained during construction of the resin—if the amine components employed contained ketimine groups—deblock by acidic hydrolysis to form the corresponding primary amino groups after or (on) conversion of the "neutralized" resin into an aqueous emulsion with elimination of the blocking ketone. Surface-coating baths (clear or pigmented) produced in this way should be stirred for a sufficient period of time (generally a few hours to several days) until the deblocking is complete and the bath data (pH, conductivity) have stabilized; only then should testing take place. Any residual content of ketimine which may be present no longer has an interfering effect here since the binders generally have sufficient basicity for adequate neutralization and ketimine structures are to a certain extent also capable of curing with blocked polyisocyanates.

The surface coating preparations containing the binders according to the invention may additionally—depending on the purpose of use—contain customary surface-coating additives. As such, the following may be mentioned here: pigments (iron oxides, lead oxides, lead silicates, titanium dioxide, barium sulfate, zinc oxide, zinc sulfide, phthalocyanine complexes etc.), pigment pastes, antioxidants, (UV) stabilizers, flow-control agents, thickeners, antifoaming agents and/or wetting agents, reactive thinners, fillers (talc, mica, kaolin, chalk, quartz powder, asbestos powder, slate powder, various silicas, silicates, etc.), additional curing agents and additional curable compounds, catalysts and the like. These additives cannot be added to the mixture, where appropriate, until just before processing.

Suitable catalysts for accelerating the curing are, for example, salts or complexes of metals, such as, for example, lead, zinc, iron, tin, manganese and bismuth. Preferred metal catalysts here are lead compounds, such as lead carboxylates having 1 to 10 carbon atoms, for example lead formate, lead acetate, lead propionate, lead lactate, lead octoate, lead acetylacetonate, etc., or tin compounds. For the tin catalysis, dibutyltin dilaurate and dibutyltin oxide or tin(IV) compounds of the formula (IX)

$$[((R^{20})_l Sn)_m(X)_n]_p \qquad (IX)$$

in which $R^{20}$ denotes an alkyl radical having 1 to 10 carbon atoms, preferably 2 to 4 or 8 carbon atoms, X denotes a monovalent or divalent carboxyl radical having 1 to 12, preferably 1 to 8 or 12, carbon atoms, or a monovalent or divalent alcohol or (poly)amine radical having 1 to 10 carbon atoms, or a mononuclear or polynuclear phenolic radical (substituted or unsubstituted), for example p-tertbutylphenol, p-nonylphenol, etc., or radicals of monovalent or divalent thiols, or denotes 0;

$l = 2$ or 3;
$m = 1$ or 2;
$n = 1$ or 2; and
$p \geq 1$, are preferably suitable.

Examples of representatives of this formula are tin-(IV) compounds which hydrolyze relatively quickly in water, such as dialkyl(butyl)tin diacetate.

The catalysts are usually employed in amounts from 0.1 to 6% by weight, preferably 0.2 to 3% by weight (calculated on the metal), relative to the curable compound (solid).

When dibutyltin dilaurate is used as the curing catalyst, it is expediently initially homogenized with the binder, and this homogeneous mixture is then subsequently added to the surface-coating preparation.

In the case of dibutyltin oxide, this is preferably initially mixed with the pigment and, if appropriate, an admixing resin and then passed to grinding. A pigment: binder ratio (PBR) of about 0.2:1 to 1:1 is desired, it being possible for the pigmentation to take place in, in principle, two ways:

1) the pigments are added to the neutralized binder, and the mixture is ground by means of a bead mill or another suitable grinding machine;

2) the neutralized binder(s) (dispersion) is pigmented by means of a highly-pigmented (PBR=6:1 to 20:1) pigment paste.

The pigment paste generally contains a paste resin, pigments, fillers, other auxiliaries which are customary in surface coatings and, if appropriate, the abovementioned catalysts.

In all cases, grinding of the binder/pigment mixture or of the pigment paste should be carried out to adequately small grain sizes (for example Hegman 7), preferably in the presence of $Al_2O_3$ (corundum) beads or ceramic or $ZrO_2$ beads (diameter 0.5–3 mm).

In the case of tin compounds of the above formula (IX), such as the relatively readily hydrolyzable dibutyltin diacetate, it is expedient to initially incorporate this into the pigment paste containing water and also, if appropriate, an admixing resin and to carry out appropriate comminution (for example Hegmann 7) at the same time. This pigment paste is then added to the binder-containing surface-coating material. Alternatively, these tin compounds can be metered, if appropriate in portions, directly into the surface-coating material already containing pigment, with vigorous mechanical mixing, such as, for example, in a bead mill using corundum (ceramic) beads. In a modification, only a (small) part of the total amount of water is initially present in the surface-coating material, while the other (larger) part is not added to the surface-coating material until after this tin compound has been metered in. In this case, it is also possible to add the tin compound mixed with an admixing resin and/or with part of the pigment.

This above-described way of metering in the tin curing catalyst is also suitable for surface-coating preparations which contain binders other than the curable compounds according to the invention.

The electrodeposition of the surface-coating particles takes place by known methods, to which reference is made here. The deposition can take place on any electroconducting substrates, for example metal, such as steel, copper, aluminum and the like.

After deposition, the coating is cured at elevated temperatures, which are generally dependent on the nature of the curing component, temperatures from 100° to 220° C., preferably 130° to 180° C., being used. The use of customary lead catalysts in the curing of the surface-coating resins according to the invention is particularly effective only when these surface-coating resins contain polyisocyanate radicals which are blocked, for example, by β-alkoxy- or β-dialkylamino alcohols and/or by ketone oximes, and can result in shorter curing times or lower baking temperatures.

In the examples below, P denotes parts by weight and % denotes percentages by weight. The amine numbers always relate to solid resin.

EXAMPLES

I. Preparation of the precursors

I.1. Preparation of 1,3-bis(methyl-5-aminopentylamino)-2-propanol (→component (B))

463 g (5 mol) of epichlorohydrin were added dropwise at 27° to 42° C. under nitrogen to a well-stirred mixture of 2325 g (20 mol) of 2-methylpentamethylenediamine ®Dytek A from Du Pont) in 1.6 liters of toluene and sodium hydroxide solution prepared from 205 g (5.1 mol) of sodium hydroxide in 210 ml of demineralized water, in a 6 liter four-necked flask equipped with dropping funnel, stirrer, thermocouple, reflux condenser with Dean-Stark water separator. After the first 50 to 60 ml (in about 5 minutes), about 10 minutes were waited until a reaction (somewhat exothermic, salt-forming) was detected. About 2 hours were required for the further addition with ice cooling. The reaction was allowed to proceed to completion at a maximum of 45° C. for a further 1.5 hours with occasional cooling and stirring until the batch no longer produced any inherent heat. After a further 20 minutes for completion at about 55° C., the water (300 g in theory) was expelled azeotropically, and the mixture was then cooled to 95° C. and finally, after addition of 5 g of ®Corolite or ®Celite, filtered under suction while hot through the filter into the distillation flask (rinsed with 200 ml of toluene). Firstly the toluene (slight vacuum), then the excess of amine (boiling point=82° C./20 torr) were removed by distillation, finally at a flask bottom temperature of 150° C./20 torr. A yellowish oil was obtained having an amine number of 779. The yield was 1440 g (100% of theory).

I.2. Preparation of 1,7-di(2-ethylhexylamino)-2,6-dihydroxy-4-isononyloxypropyl-4-iminoheptane (→component (B))

a) Using the same apparatus as in I.1., epichlorohydrin (186 P, 2 mol) was added dropwise at 30° C. to 35° C. to a well-stirred mixture of 202 P (1 mol) of isononyloxypropylamine in 250 P of n-butanol. After about 20 to 50 ml, a measurable evolution of heat began, and the remaining amount of epichlorohydrin was subsequently metered in over the course of 3 hours with cooling. The reaction was then allowed to continue at 35° C. to 50° C. (for about 1 hour).

b) 774 P (6 mol) of 2-ethylhexylamine were run into 80 P (2 mol) of NaOH in 90 P of demineralized H₂O.

The reaction product from step a) was added to the amine from step b) at 40° C.-50° C. Salt formation was subsequently observed, and the reaction was allowed to continue at 50° C. for 1 hour. The water was then expelled azeotropically (about 110 P), and the mixture was then cooled to 95° C. and, after addition of 5 g of Corolite, filtered with suction while hot through the filter into the distillation flask (rinsed with 200 ml of n-butanol). Firstly the n-butanol (60° C., 50–100 torr) and then the excess of amine (20 torr, 130° C.) were removed by distillation.

Yield: 575 g (100% of theory), amine number: 296 (theory 293) (only secondary amino groups).

I.3. Preparation of the diketimine of 1,3-bis(methyl-5-aminopentylamino)-2-propanol (→component (B))

290 P (1 mol, 2 equivalents of primary amine) of the amine of Example I.1 were dissolved in 313.5 P (3.135 mol) of methyl isobutyl ketone, and the water produced was expelled azeotropically at 115° C. to 140° C. (about 36 to 30 ml). This ketimine solution (about 80% strength) was then concentrated under reduced pressure at 60° C. to 100° C. until about 113 g of methyl isobutyl ketone (corresponding to a solid content of the product of about 100%) had been stripped off.

Yield: 452 g (100% of theory), amine number: 478 (theoretically 498), yellowish oil.

I.4. Preparation of a semi-blocked diisocyanate

124 P (105 mol) of butyl glycol were run into 174 P (1 mol) of ®Desmodur T 80 (80% of 2,4-, and 20% of 2,6-toluylene diisocyanate) at 30° C. to 70° C. in the presence of 0.9% by weight of benzyltrimethylammonium hydroxide as catalyst, and the reaction was carried out to a NCO content of about 13.0 to 14.1%.

I.5. Preparation of a flexibilizing compound

415 P (1 equivalent of OH) of ®Capa 205 (polycaprolactonediol, MW about 840, supplied by Interos, England) and 300 P (1 equivalent of OH) of commercially available polyethylene glycol 600 (supplied by Hoechst AG, MW about 600) were mixed with 152 P (1 mol) of tetrahydrophthalic anhydride and 266 P (1 mol) of dodecenylsuccinic anhydride (Shell), and reacted in the presence of 0.3% of triethylamine at 80° C.-120° C. until an acid number of about 98 to 102 mg of KOH/g of solids had been reached.

II. Preparation of the curable compound (binder)

II.1. 832 PW of a monoepoxy-monocyclocarbonate (=2 equivalents of epoxide) based on commercially available ®Epicote 828 (=diglycidyl ether of bisphenol A) were warmed to about 60° C. to 80° C. and, in the presence of 0.2 to 0.4% by weight of commercially available chromium catalyst ®AMC-2 (100% purity by weight, product of Cordova Chemicals, U.S.A.), run into a mixture of 1133 PW of flexibilized dicarboxylic acid (=2 equivalents of HOOC groups), prepared in accordance with Example I.5, and PW of dimethyl diglycol. The reaction mixture was allowed to react at 80° C. to 120° C. until an acid number of <5 and an epoxide number of <0.1 had been reached. The resultant reaction product was obtained as an approximately 90% strength by weight solution in DMDG and subsequently diluted to a content of 80% by weight of reaction product by adding about 273 PW of DMDG. The yield of the flexibilized bis-cyclocarbonate desired was virtually 100%.

2620 P (4 equivalents of cyclic carbonate) of a bis-cyclocarbonate (80% strength in DMDG) based on commercially available Epicote 1001 and 608 P of a monocyclocarbonate (2 equivalents of cyclic carbonate) based on the glycidyl ester of versatic acid were introduced into this mixture, and the mixture was reacted at 30° C. to 80° C. with 2384 P (about 7.6 equivalents of NCO) of semi-blocked diisocyanate prepared in accordance with Example I.4. until a NCO content of about 0% was obtained. A mixture of 452 P (2 equivalents of NH) of the diketimine of I.3., 645 P (6 equivalents of $NH_2$) of bishexamethylenetriamine, 627 P of butyl diglycol and 2746 P of methoxypropanol was reacted with this carbonate solution at 60° C. to 100° C. in the presence of 0.1% strength DABCO to an amine number of 34.5 mg of KOH/g of solids. The resultant reaction product was obtained as a 65% strength by weight highly viscous binder resin solution.

II.2. 3930 P (6 equivalents of cyclic carbonate, 80% strength in DMDG) of a biscarbonate based in Epicote 1001, 608 P (2 equivalents of cyclic carbonate) of a monocyclocarbonate based on the glycidyl ester of versatic acid were mixed with 978 P of DMDG and the mixture was heated to about 60° C. 2384 P (about 7.6 equivalents of NCO) of semi-blocked diisocyanate prepared according to Example I.4. were introduced into this mixture and reacted at 60° C. to 80° C. to a NCO content of about 0%. 430 P (4 equivalents of primary amine) of bishexamethylenetriamine, 452 P (2 equivalents of secondary amine) of the diketimine of Example I.3., 575 P (2 equivalents of secondary amine) of the amine of Example I.2. in 2017 P of methoxypropanol and 500 P of butyl diglycol were run into this solution. The reaction was carried out in the presence of 0.1% strength N-pyrrolidinopyridine at 80° C. to 100° C. to an amine number of about 45.1 mg of KOH/g of solid resin. The resultant reaction product was obtained as a 65% strength highly viscous binder resin solution.

III. Use of the binders of Examples II for surface-coating preparations

Pigmented surface-coating materials were prepared, corresponding to the following batches, from the binders of Examples II.1 and II.2:

III.1. Preparation of a pigment paste (PBR about 12:1)

70.5 P of 100% SWE 5219 paste resin from Vianova
6.9 P of lactic acid, 100%
220.0 P of demineralized water
51.0 P of lead silicate
80.0 P of dibutyltin oxide
9.2 P of carbon black (®Printex 25)
370.0 P of titanium dioxide (®Kronos RN 59)
13.2 P of butyl glycol
1500.0 P of zirconium oxide beads The batch was ground for 60 minutes with thorough cooling and subsequently adjusted to the processing viscosity using 108.0 P of demineralized water and sieved.

III.2. Pigmentation of II.1

690.0 P of the binder of II.1 (65% strength) and 16.6 P of 50% strength aqueous formic acid (=meq =40) were thoroughly homogenized in a dissolver and subsequently mixed with 286.0 P of the pigment paste of III.1 (63% strength), the mixture was thoroughly homogenized, and 25.07 P of demineralized water was subsequently added slowly (bath solids content about 18%).

III.3. Pigmentation of II.2

690.0 P of the binder of II.2 (65% strength) and 22.5 P of dibutyltin dilaurate were thoroughly homogenized and neutralized using 18.6 P of 50% strength aqueous formic acid (meq=45). 160.0 P of titanium dioxide (Kronos RN 59), 5.0 P of carbon black (Printex 25) and 15.0 P of lead silicate were subsequently added, and the total mixture was ground in a triple-roll mill, and 2590 P of demineralized water were subsequently added (bath solids content about 18%).

III.4. Use as an electrocoating material

The surface-coating preparations III.2 and III.3 were subjected to cataphoretic deposition in an open glass vessel. The cathode used was zinc-phosphated steel sheeting and the anode used was bare steel sheeting at a distance of 5 to 10 cm from the cathode. The duration of deposition was 2 minutes.

The voltages applied in each case, the form of thicknesses achieved and the properties of the deposited and subsequently cured films (baking conditions: 20 minutes at an object temperature of 150° C.) are shown in summarized form in the table below):

TABLE

| Resin employed | I.1 | II.2 |
|---|---|---|
| Bath pH | 6.8 | 6.5 |
| Maximum rupture voltage (V)[1] | 300 | 250 |
| Depositon voltage (V)[1] | 250 | 200 |
| Film thickness (μm) | 18–20 | 16–18 |
| Throw[2] | 1 | 1–2 |
| Adhesion[2] | 0 | 0 |
| Crosslinking[3] | >100 | >100 |
| Impact cupping[4] | >80 | >80 |
| Erichsen cupping (mm) | 5–6 | 5 |

[1] at 28° C.
[2] 0 = best, 5 = worst value
[3] Double rups with MEK, 1 kg weight add-on; baking conditions: 20 min (oven), 150° C.
[4] Inch pound, in accordance with ASTM

We claim:
1. A curable compound carrying groups containing basic nitrogen, essentially comprising structural units derived from

A) a compound which contains, on average, at least one optionally terminal 2-oxo-1,3-dioxolane group per molecule, with B) a secondary diamine containing hydroxyl groups in the β-positions to the secondary amino group and optionally containing blocked primary amino groups.

2. A curable compound as claimed in claim 1 wherein compound (A) has the formula I

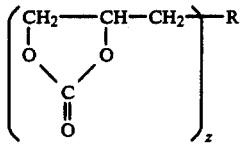

in which

R denotes a z-valent radical of a polyether, polyether polyol, polyester or polyester polyol, which radical may also contain (NR$^2$) groups where R$^2$ represents hydrogen, alkyl having 1 to 8 carbon atoms or hydroxyalkyl having 1 to 8 carbon atoms, or a z-valent hydrocarbon radical which may optionally carry inert or non-interfering groups, or a z-valent poly(sec.)amine radical or the z-valent radical of a product of the reaction of an epoxy-carbonate compound with a compound selected from the group consisting of polyamines, polyols, polycaprolactone polyols, OH group-containing polyesters, polyethers, polyglycols, hydroxyl-, carboxyl- and amino-functional polymer oils having mean molecular weights from 800 to 10,000, polycarboxylic acids, hydroxyl- or amino-functional polytetrahydrofurans and products of the reaction of polyamines with glycidyl esters of α,α-dialkylalkanemonocarboxylic acids of the empirical formula $C_{12-14}H_{22-26}O_3$ or with the glycidyl ester of versatic acid, and z denotes 1 to 5.

3. A curable compound as claimed in claim 2, wherein Z represents 2.

4. A curable compound as claimed in claim 1, wherein compound A) is prepared from an epoxide-/carbonate of the formula (II)

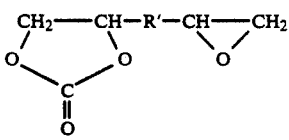 (II)

through reaction with a multifunctional compound which can be adducted with the epoxide group, where R' corresponds to the meaning of R and the reaction is carried out under conditions under which only the epoxide groups react and the carbonate groups are not attacked.

5. A curable compound as claimed in claim 1, wherein the amine (B) has the formula (III)

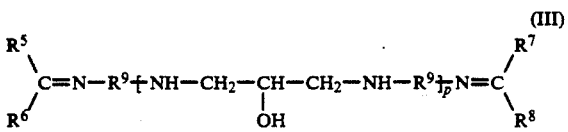 (III)

in which:

$R^5$, $R^6$, $R^7$ and $R^8$ denote identical or different ($C_1$–$C_6$)alkyl (branched or unbranched), or $R^5$ and $R^6$ or $R^7$ and $R^8$ denote part of a cycloaliphatic ring, or in each case one of the radicals $R^6$ and/or $R^8$ denotes aryl having 6 to 12 carbon atoms;

$R^9$ denotes

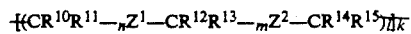

where $Z^1$ and $Z^2$ denote O, S, N-alkyl having up to 8 carbon atoms, N-phenyl, N-mono-, -di- or -trialkylphenyl having 1 to 4 carbon atoms per alkyl group, a divalent phenylene radical which is optionally substituted by inert or non-interfering groups, and/or a chemical bond, $R^{10}$ to $R^{15}$ denote H, $CH_3$, $C_2H_5$, phenyl or mono-, di- or trialkylphenyl having 1 to 4 carbon atoms per alkyl group, n, m and l denote 0 to 12, where the sum of n+m+l≧2, and k denotes 1 to 6, and p denotes 1.

6. A curable compound as claimed in claim 1, wherein the amine (B) has the formula IV

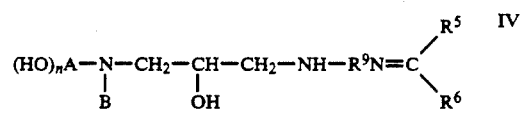

in which $R^5$ and $R^6$ denote identical or different ($C_1$–$C_6$)alkyl (branched or unbranched), or $R^5$ and $R^6$ or $R^7$ denote part of a cycloaliphatic ring, or $R^6$ denotes aryl having 6 to 12 carbon atoms and $R^9$ (B) has the formula III

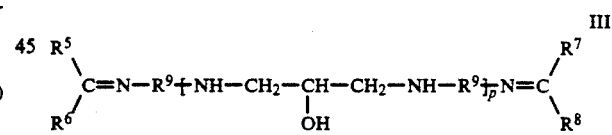 III

A denotes branched or unbranched ($C_1$–$C_6$)alkyl,

B denotes hydrogen and

C denotes 1 to 5.

7. A curable compound as claimed in claim 1, wherein the amine (B) has the formula V

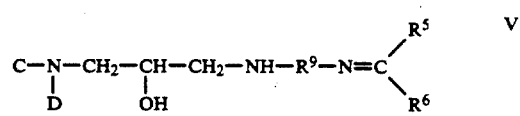

in which $R^5$ and $R^6$ denotes identical or different ($C_1$–$C_6$)alkyl (branched or unbranched), or $R^5$ and $R^6$ or $R^7$ denote part of a cycloaliphatic ring, or $R^6$ denotes aryl having 6 to 12 carbon atoms and $R^9$ (B) has the formula III

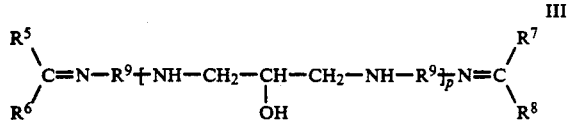

C denotes branched or unbranched $(C_1-C_8)$alkyl or $(C_5-C_9)$cycloalkyl, optionally substituted by $(C_1-C_3)$alkyl groups, and D denotes hydrogen.

8. A curable compound as claimed in claim 1, wherein the amine (C) has the formula (VI)

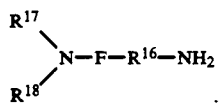

in which $R^{16}$ denotes a divalent hydrocarbon radical, preferably a straight-chain or branched alkylene radical having 2 to 18 carbon atoms which may optionally carry inert or non-interfering groups, $R^{17}$ and $R^{18}$ are identical or different and denote hydrogen, alkyl having 1 to 8 carbon atoms or hydroxyalkyl having 1 to 8 carbon atoms in the alkyl radical, it being possible for $R^{17}$ and $R^{18}$ to produce a cyclic ring compound, and F denotes a chemical bond or $-(R^{16}-NH)_r-R^{16}-NH-$ in which r is zero or an integer from 1 to 6 and $R^{16}$ has the above meaning.

9. A curable compound as claimed in claim 1, wherein it additionally contains structural units derived from chain terminators (D).

10. A curable compound as claimed in claim 9, wherein the chain terminators (D) are monocarbonates, monoepoxides or partially blocked polyisocyanates.

11. A curable compound as claimed in claim 9, wherein the chain terminators (D) have the formula (VII)

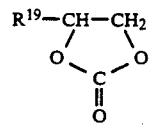

in which $R^{19}$ denotes hydrogen, alkyl having 1 to 18, carbon atoms, or radicals of the glycidyl ester of versatic acid, glycidyl esters or glycidyl ethers.

12. A curable compound as claimed in claim 9 wherein the chain terminators (D) have the formula VIII

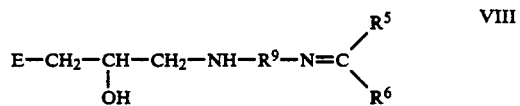

in which $R^5$ and $R^6$ denote identical or different $(C_1-C_6)$alkyl, (branched or unbranched), $R^5$ and $R^6$ or $R^7$ denote part of a cycloaliphatic ring, or $R^6$ denotes aryl having 6 to 12 carbon atoms and $R^9$ (B) has the formula III

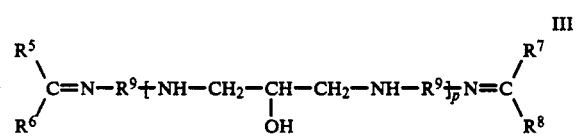

and

E denotes $(C_2-C_8)$alkoxy, linear or branched, or $(C_5-C_{15})$acryloxy, preferably branched.

13. A curable compound as claimed in claim 1, wherein some of the hydroxyl and/or amino groups present have been reacted with partially blocked polyisocyanates.

14. A curable compound of claim 5 wherein $n+m \geq 4$ and k is 1 to 3.

15. A curable compound of claim 11 wherein $R_{19}$ is alkyl of 1 to 10 carbon atoms.

16. A compound of claim 1 also containing a structural unit c) derived from a difunctional amine containing at least one free primary amino group and optionally at least one secondary amino group.

17. A compound of claim 1 wherein the diamine also contains at least one blocked primary amino group.

* * * * *

UNITED STATES PATENT AND TRADEMARK OFFICE
CERTIFICATE OF CORRECTION

PATENT NO. : 5,132,458
DATED : July 21, 1992
INVENTOR(S) : MICHAEL HÄNEL; PETER ZIEGLER and HARTMUT FOEDDE It is certified that error appears in the above-identified patent and that said Letters Patent is hereby corrected as shown below:

Col.     Line 9
20           "$\text{--}[(CR^{10}R^{11}\text{---})_n Z^1\text{---}CR^{12}R^{13}\text{---}_m Z^2\text{---}CR^{14}R^{15}\text{--})_k$"

should be $\text{--}[(CR^{10}R^{11}\text{---})_n Z^1\text{---}(CR^{12}R^{13}\text{---})_m Z^2\text{---}(CR^{14}R^{15}\text{--})]_k\text{--}$ 20    Claim 5, line 23 "$Z2$"    should be  -- $Z^2$ --
21    Line 10    "($C_1$-$C_3$)"    should be    --($C_2$    --($C_1$-$C_3$)--

Signed and Sealed this

Thirty-first Day of August, 1993

*Attest:*

BRUCE LEHMAN

*Attesting Officer*     Commissioner of Patents and Trademarks